(12) United States Patent
Gilleran

(10) Patent No.: US 9,337,647 B2
(45) Date of Patent: May 10, 2016

(54) AIR CONDITIONING FLASHING HOOD

(71) Applicant: William J. Gilleran, Las Vegas, NV (US)

(72) Inventor: William J. Gilleran, Las Vegas, NV (US)

(*) Notice: Subject to any disclaimer, the term of this patent is extended or adjusted under 35 U.S.C. 154(b) by 0 days.

(21) Appl. No.: 14/203,225

(22) Filed: Mar. 10, 2014

(65) Prior Publication Data

US 2014/0259974 A1 Sep. 18, 2014

Related U.S. Application Data

(60) Provisional application No. 61/798,434, filed on Mar. 15, 2013.

(51) Int. Cl.
| | | |
|---|---|---|
| *H02G 3/22* | (2006.01) | |
| *F16L 5/02* | (2006.01) | |
| *H02H 3/22* | (2006.01) | |

(52) U.S. Cl.
CPC ... *H02H 3/22* (2013.01); *F16L 5/02* (2013.01)

(58) Field of Classification Search
CPC ............. H02G 3/22; H02G 3/18; H02G 3/08; F24F 1/34; E04F 13/0869; F16L 5/02; F16L 5/00; F16L 5/04
USPC ................................................. 52/220.8, 61
See application file for complete search history.

(56) References Cited

U.S. PATENT DOCUMENTS

| | | | |
|---|---|---|---|
| 791,068 A | 5/1905 | Baker | |
| 2,114,811 A * | 4/1938 | Reid et al. ....................... 105/37 | |
| 2,800,850 A | 7/1957 | McKann | |
| 2,985,465 A | 5/1961 | Church | |
| 3,135,535 A * | 6/1964 | Shepard ...................... 285/124.2 |
| 3,371,503 A | 3/1968 | Perez | |
| 3,438,219 A | 4/1969 | Brugler | |
| 3,611,743 A | 10/1971 | Manganaro | |
| 3,651,245 A | 3/1972 | Moll | |
| 3,683,305 A | 8/1972 | Gray | |
| 3,936,589 A | 2/1976 | Teeters et al. | |
| 3,955,701 A | 5/1976 | Fisch | |
| 4,102,090 A | 7/1978 | Anguish | |
| 4,135,337 A | 1/1979 | Medlin | |
| 4,175,402 A | 11/1979 | Hile | |
| 4,296,870 A | 10/1981 | Balkwill et al. | |
| 4,473,244 A | 9/1984 | Hill | |
| 4,526,407 A | 7/1985 | Kifer | |
| 4,569,458 A | 2/1986 | Horsley | |
| 4,607,469 A | 8/1986 | Harrison | |
| 4,673,097 A | 6/1987 | Schuldt | |
| 4,688,747 A * | 8/1987 | Helmsdorfer ............ H02G 3/22 174/67 |
| 4,757,158 A | 7/1988 | Lentz | |
| 4,794,207 A | 12/1988 | Norberg et al. | |
| 5,211,695 A * | 5/1993 | Dowler ....................... 285/140.1 |
| 7,140,646 B2 * | 11/2006 | Parker ........................ F16L 5/00 174/58 |

(Continued)

*Primary Examiner* — Andrew J Triggs
(74) *Attorney, Agent, or Firm* — Stetina Brunda Garred & Brucker

(57) ABSTRACT

An air conditioning flashing hood adapted to be connected to the wall structure and extend through the exterior wall of the structure to provide a passage through which a refrigerant line and an electrical control line may extend to communicate with an external compressor. The air conditioning flashing hood includes an internal sealing element which compresses against the outer surface of the refrigerant line and the electrical control line to form a substantially weather-tight seal therebetween to mitigate fluid migration along the lines into the structure, as well as to provide a barrier for any bugs, debris or animals to keep such undesirable objects from entering the structure.

20 Claims, 2 Drawing Sheets

(56) References Cited

U.S. PATENT DOCUMENTS

| | | | | |
|---|---|---|---|---|
| 7,305,801 B2 * | 12/2007 | Gilleran | | 52/220.8 |
| 7,389,616 B2 * | 6/2008 | Gilleran | | 52/220.8 |
| 7,495,171 B2 * | 2/2009 | Gorin | | H02G 3/085 |
| | | | | 174/66 |
| 7,640,699 B2 * | 1/2010 | Gilleran | | 52/220.1 |
| 7,730,681 B2 * | 6/2010 | Gilleran | | 52/220.8 |
| 7,973,250 B2 * | 7/2011 | Groeller | | H02G 3/22 |
| | | | | 138/157 |
| 8,404,973 B1 * | 3/2013 | Gretz | | H02G 3/083 |
| | | | | 174/53 |
| 8,490,815 B2 * | 7/2013 | Provenzano | | H02G 3/14 |
| | | | | 174/151 |
| 8,872,044 B2 * | 10/2014 | Nice | | H02G 3/22 |
| | | | | 174/668 |
| 2005/0102913 A1 * | 5/2005 | Gilleran | | 52/58 |
| 2006/0123711 A1 * | 6/2006 | Gilleran | | 52/27 |
| 2007/0261327 A1 * | 11/2007 | Gilleran | | 52/220.1 |
| 2008/0148654 A1 * | 6/2008 | Gilleran | | 52/58 |
| 2010/0181088 A1 * | 7/2010 | Stolt | | H02G 3/22 |
| | | | | 174/15.3 |
| 2014/0259974 A1 * | 9/2014 | Gilleran | | 52/62 |
| 2015/0214706 A1 * | 7/2015 | Feng | | H02G 3/088 |
| | | | | 174/652 |

* cited by examiner

AIR CONDITIONING FLASHING HOOD

CROSS-REFERENCE TO RELATED APPLICATIONS

This application claims the benefit of U.S. Provisional Application No. 61/798,434, filed Mar. 15, 2013, the contents of which are expressly incorporated herein by reference.

STATEMENT RE: FEDERALLY SPONSORED RESEARCH/DEVELOPMENT (Not Applicable)

BACKGROUND OF THE INVENTION

1. Field of the Invention

The present invention relates generally to a moisture barrier, and more specifically to an air conditioning flashing hood extendable through an exterior wall and configured to define a substantially weather-tight seal with an air conditioner refrigerant line(s) and an electrical control line(s) extending therethrough to mitigate fluid migration and unwanted entry of bugs, debris or animals through an opening formed in the exterior wall.

2. Description of the Related Art

As is commonly known, air conditioners typically use evaporation of a refrigerant, like Freon, to provide air cooling. For example, conventional window mounted air conditioners have traditionally been utilized in small indoor spaces (e.g., one-bedroom apartment), and is generally small enough to fit into a standard window frame. The air conditioner is then operated for cooling in which its fan blows over its condenser coils to deliver cold air to the indoor space.

Although conventional window air conditioners are suitable for small indoor spaces, they are not, however, effective or efficient for cooling larger indoor spaces such as a residential house or a commercial building. As such, central air conditioners are typically used for larger residential houses and commercial buildings. The central air conditioner is typically a more efficient way to cool such larger indoor spaces by providing controlled flow of chilled air through the air ducts of a conventional forced-air heating/cooling system.

As is known, central air conditioners include a compressor typically installed outside the residential house or commercial building and a evaporator unit/coil unit typically located inside the building and resident within a conventional forced air heating and ventilation (HVAC) system.

Typically, the compressor of the central air conditioner is placed on a concrete pad located outside the residential house or commercial building. It is connected to the evaporator disposed within a forced-air heating system located inside the house or by a number of air conditioning lines/conduits which extend through a section of an exterior wall of the building. More specifically, at least two refrigerant lines (typically a feed and return copper pipe for a compressive refrigerant gas) and a control line(s) (electrical line for selectively activating the compressor and fan of the air conditioning system) extend between the outside-located compressor and the inside-located condenser of the forced-air heating system.

The refrigerant line(s) and the control line(s) typically extend through an opening formed in the exterior wall so as to extend between the air conditioner condenser and evaporator unit. Although the opening serves the purposes of allowing the refrigerant and control lines to extend between the condenser and evaporator unit, the opening also creates additional problems. For instance, water from rain, snow, sprinklers, or vandalism may pass through the opening and cause damage to the inside of the structure. Furthermore rodents or other foreign objects may enter the structure through the opening.

Therefore, several prior art products and techniques have been developed in an attempt to close the opening so as to reduce the likelihood that water, animals, debris, etc. will pass through the opening. One product commonly used is an exterior roof jack flashing, which generally includes a conically shaped sheet metal body or plastic which protrudes outwardly through the wall and provides a single enlarged opening leading to the inside of the building. However, due to the extensive size, the openings of the roof jack flashing remains substantially open, i.e., unfilled, despite the lines passing therethrough.

In an attempt to fill the open space in the flashing, it has been a common practice in the field to simply push a rag or fabric matter around the lines to block the opening. More particularly, the rags or fabric matter are typically dipped in a sealant such as tar and pushed into the opening to fill the spacing surrounding the air conditioning lines. As an alternative method, spray foam or flashing tapes were also used to seal off the opening.

Although such method has proven to be somewhat effective initially in sealing the opening, it is significantly deficient to seal the opening over time. More specifically, due to its fabric structure, the rage or matting tends to degrade over time. This is also the same for the foam adhesive taps which tend to degrade over time. Further the pliability of flexibility of the rage or matting allows shifting from its original sealing positions when the exterior wall vent is inadvertently contact.

In recognizing these deficiencies, the present applicant developed an air conditioning line flashing panel, as disclosed and claimed in U.S. Pat. No. 7,640,699, the disclosure of which is expressly incorporated herein by reference. However, the use of such flashing panel typically has been limited to stucco or thin wood siding applications and not used in thick, decorative brick or stone cladding applications.

In view of the foregoing, there exists a need in the art for an air conditioning flashing hood or cover which can create a seal around the refrigerant and control lines extending through both relatively thick brick or stone clad or relatively thin stucco or wood clad exterior walls. The present invention addresses this particular need, as will be discussed in more detail below.

BRIEF SUMMARY OF THE INVENTION

According to an aspect of the present invention, there is provided an air conditioning flashing hood adapted to be connected to the frame members of a structure and extend through the exterior wall of the structure to provide a passage through which a refrigerant line and an electrical control line(s) may extend to communicate with an external compressor. The air conditioning flashing hood includes an internal sealing element which compresses against the outer surface of the refrigerant line and the electrical control line(s) to form a substantially weather-tight seal therebetween to mitigate fluid migration along the lines into the structure, as well as to provide a barrier for any bugs, debris or animals to keep such undesirable objects from entering the structure.

According to one embodiment, the air conditioning flashing hood includes a plate member having a front surface and an opposing rear surface, with a plate opening formed within the plate member and extending between the front and rear surfaces. A hood member extends outwardly from the plate member and defines an internal hood opening in communication with the plate opening. A sealing member is coupled to the hood member and is transitional relative to the hood member between a relaxed configuration and a compressive configuration in response to insertion of the refrigerant line and control line(s) through the sealing element.

The air conditioning flashing hood may additionally include a sealing plate coupled to the hood member and the sealing element. The sealing plate may include a sealing plate opening and the sealing element may be coupled to the sealing plate so as to extend into the sealing plate opening.

The sealing element may be formed from a polymer and/or an elastomeric material, or a synthetic, simulated elastomeric material.

The present invention is best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings in which like numbers refer to like parts throughout and in which.

DETAILED DESCRIPTION OF THE INVENTION

Figure 1:
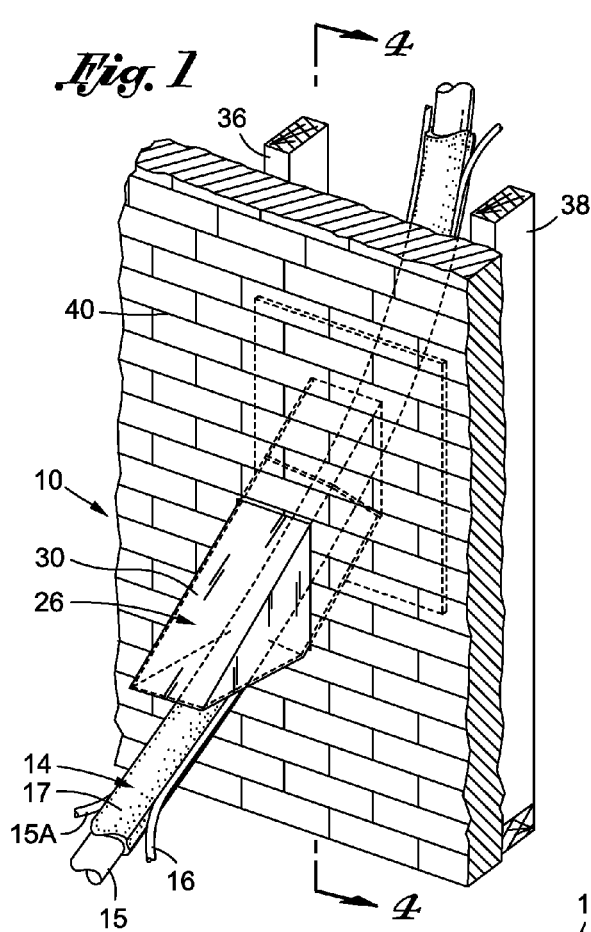
FIG. 1 is an upper perspective view of an air conditioning flashing hood extending through an exterior wall.

The detailed description set forth below in connection with the appended drawings is intended as a description of the presently preferred embodiments of the invention, and is not intended to represent the only form in which the present devices may be developed or utilized. It is to be understood, however, that the same or equivalent functions may be accomplished by different embodiments that are also intended to be encompassed within the spirit and scope of the invention. It is further understood that the use of relational terms such as first, second, and the like are used solely to distinguish one from another entity without necessarily requiring or implying any actual such relationship or order between such entities.

Referring now to the drawings, wherein the showings are for purposes of illustrating a preferred embodiment of the present invention only, and are not for purposes of limiting the same, there is depicted an air conditioning flashing hood 10 having a sealing element 12 configured to compress against the outer surface of an air conditioner refrigerant line 14 and a control line(s) 16 to create a substantially weather tight seal therebetween. The seal between the flashing hood 10 and the refrigerant and control lines 14, 16 mitigates fluid migration into the structure along the lines 14, 16, and also serves to prevent bugs, animals and debris from entering the structure.

Figure 3:
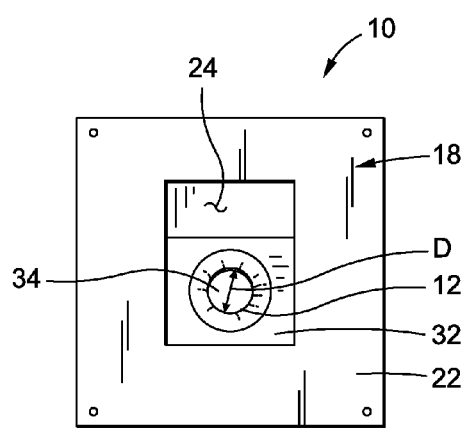
FIG. 3 is a rear elevation view of the air conditioning flashing hood.
Figure 2:
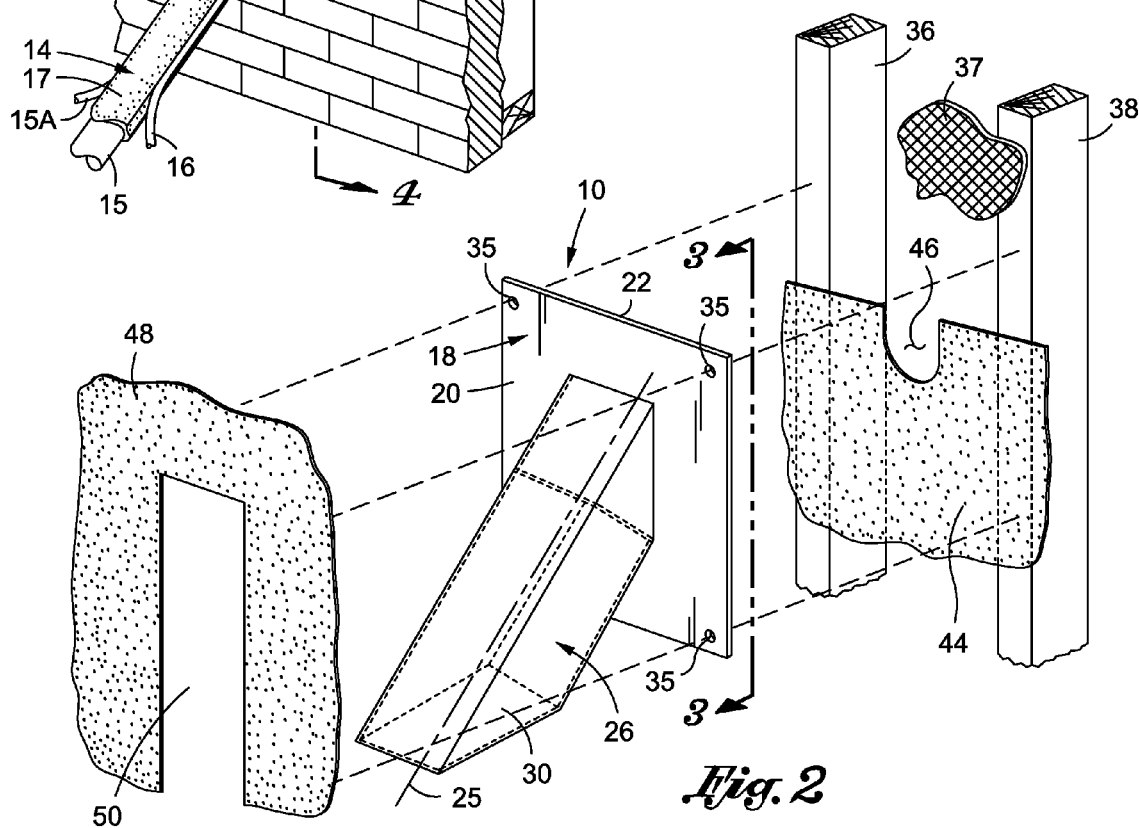
FIG. 2 is an exploded view showing the air conditioning flashing hood interposed between two weather resistant barriers (WRB) or paper sheets and attachable to a shearing wall having a pair of frame members.

According to one embodiment, the air conditioning flashing hood 10 includes a plate member 18 having a front surface 20 (see FIG. 2) and an opposing rear surface 22 (see FIG. 3). The plate member 18 further includes a plate opening 24 extending from the front surface 20 to the rear surface 22. In one implementation, the plate opening 24 defines a quadrangular shape and is approximately 5 inches×7 inches, although other embodiments may include an opening defining other shapes and sizes without departing from the spirit and scope of the present invention.

A hood member 26 extends downwardly from the plate member 18 and defines a hood opening 28 extending along a longitudinal hood axis 25 and in communication with the plate opening 24. The hood member 26 may be integrally formed with the plate member 18 or may be attached thereto via welding, rivets, adhesives or other bonding techniques known in the art. Both the hood member 26 and plate member 18 may be formed from a strong, durable, rigid and/or semi-rigid material, such as plastic, metal or the like. It is also contemplated that the flashing hood 10 may be formed from an injection molded polymer or sheet metal.

The hood member 26 includes a peripheral wall 30 disposed about the hood opening 28 and extending angularly from the front surface 20 of the plate member 18. In this regard, the hood member 26 extends away from the front surface 20 at a non-orthogonal angle relative to the front surface 20. In a preferred embodiment, the hood member 26 is configured to extend downwardly from the plate member 18 when the air conditioning flashing hood 10 is installed.

In the exemplary embodiment, the peripheral wall 30 defines a quadrangular cross section in a transverse cross sectional plane. According to one embodiment, the hood opening 28 is also quadrangular and is approximately 5 inches×7.25 inches adjacent the distal end of the hood member 26 (i.e., the end of the hood member 26 extending away from the plate member 18). Those skilled in the art will readily appreciate that the aforementioned shape and dimensions of the hood opening 28 are exemplary in nature only and that other hood members 26 may define a different shape (i.e., circle, oval, triangle, etc.) and/or different dimensions.

The flashing hood 10 additionally includes a sealing plate 32 coupled to the peripheral wall 30 of the hood member 26 and extending within a plane that is preferably perpendicular to the longitudinal hood axis 25. The sealing plate 32 includes a sealing plate opening 34 and is coupled to an elastomeric sealing element 12 that is disposed within the sealing plate opening 34. In one embodiment, the sealing plate opening 34 is approximately 4 inches in diameter, although other shapes and sizes are contemplated for different embodiments. The sealing element 12 defines an inner diameter "D" which expands to receive the refrigerant and control lines 14, 16

The refrigerant line 14 and control line 16 extend through the plate opening 24 and hood opening 28, via the sealing plate opening 34, such that the sealing element 12 exerts a compressive force about the refrigerant and control lines 14, 16 to form a substantially weather-tight seal between the refrigerant and control lines 14, 16, and the sealing element 12. Most refrigerant lines 14 typically include an inner feed conduit(s) 15 and return conduit 15A and an outer insulation layer 17 disposed about the inner conduit 15. The outer insulation layer 17 is typically formed from a compressible foam material. When the refrigerant and control lines 14, 16 extend through the sealing element, 12, the compressive force of the sealing element 12 pushes the control line 16 into the outer insulation layer 17 to enhance the substantially weather-tight engagement between the lines 14, 16 and the sealing element 12.

According to one embodiment, the sealing element 12 is transitional between a relaxed configuration and a compressive configuration relative to the sealing plate 32 in response to insertion of the refrigerant and control lines 14, 16 through the sealing element 12. Along these lines, the inner diameter D increases as the sealing element 12 transitions from the relaxed configuration toward the compressive configuration.

Insertion of the refrigerant and control lines 14, 16 through the sealing element 12 causes the sealing element 12 to transition and stretch from the relaxed configuration to the compressive configuration. The sealing element 12 may be biased toward the relaxed configuration such that when the lines 14, 16 are advanced through the sealing element 12, the biasing force urges the sealing element 12 into circumferential engagement with the lines 14, 16 to create the substantially weather-tight seal therebetween.

The sealing element 12 may be formed of an elastomeric material, such as rubber or plastic, although other elastomeric materials known by those skilled in the art may also be used without departing from the spirit and scope of the present invention. Furthermore, it is contemplated that the sealing element 12 may be formed from a simulated elastomeric material, which is slightly stretchable and biasable to compress around the refrigerant and control lines 14, 16. As will be noted, the sealing element 12 is positioned upwardly within the interior of the hood member 26 so as to be shielded from direct exposure to light and ambient conditions to reduce long-term degradation of the sealing element 12.

Figure 4:
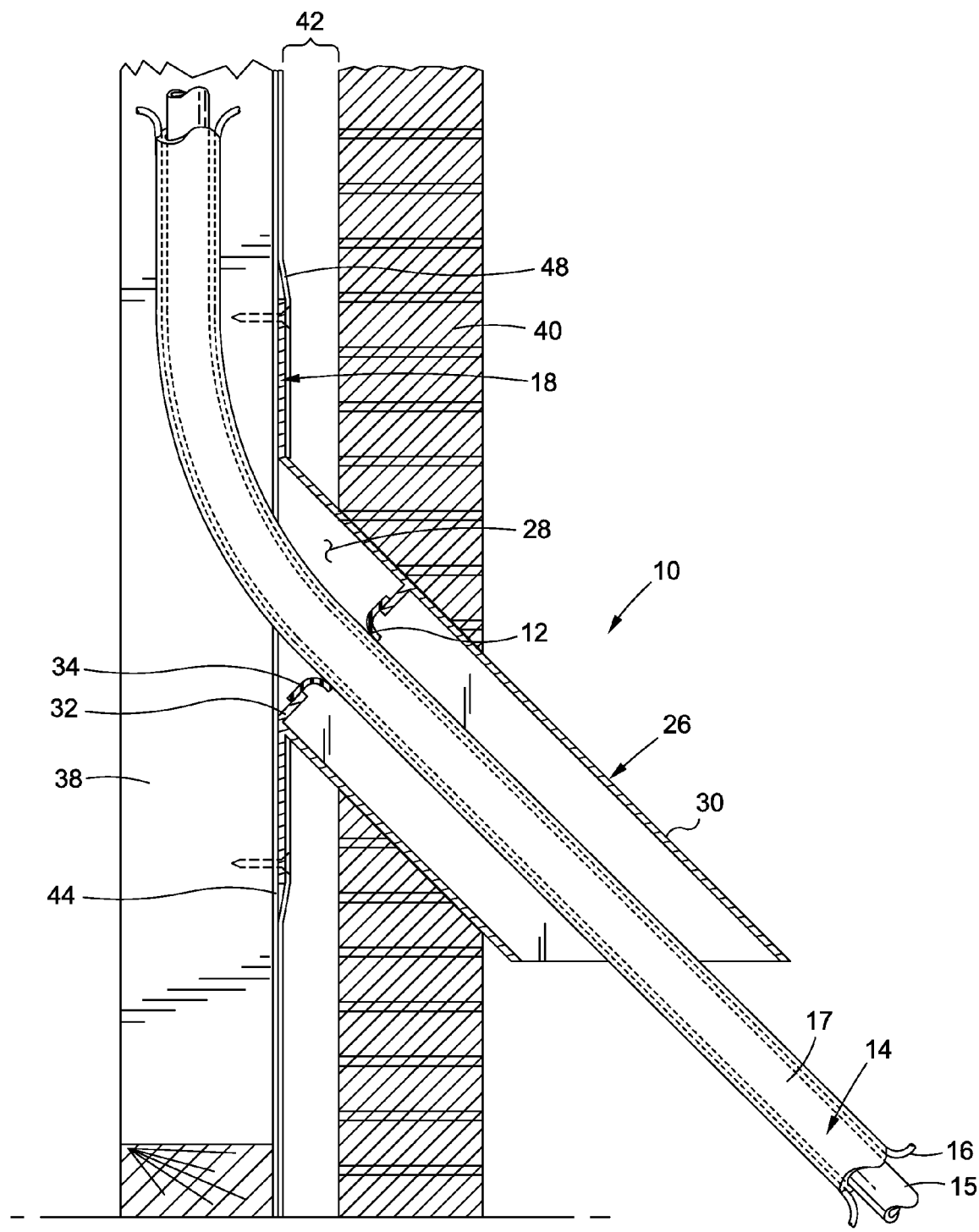
FIG. 4 is a side sectional view of the air conditioning flashing hood extending through the wall depicted in FIG. 1.

The flashing hood 10 is preferably installed during original construction of the structure. The structure includes a pair of adjacent frame members 36, 38 which is typically covered with a plywood shear panel 37 partially shown in FIG. 2 and may include an exterior wall façade 40, such as a brick and/or stone wall. In most cases, the brick/stone façade 40 is spaced from the frame members 36, 38 to create an air gap 42 (see FIG. 4) between the brick/stone façade 40 and the frame members 36, 38.

The plate member 18 is coupled to the shear panel 37 or frame members 36, 38 via mechanical fasteners, such as nails, screws or other fasteners known in the art. The plate member 18 may include one or more user formed openings 35 for fastening the plate member 18 to the frame members 36, 38 or shear panel 37 as desired.

A rear WRB and/or paper sheet 44 is preferably disposed between the plate member 18 and the shear panel 37 and supporting frame members 36, 38. According to one embodiment, the rear WRB and/or building wrap or paper sheet 44 is utilized, although other sheets or materials known by those skilled in the art may also be used without departing from the spirit and scope of the present invention. The rear paper sheet 44 preferably includes a cutout 46 formed therein and the rear paper sheet 44 is aligned with the flashing hood 10 such that the cutout 46 is aligned and in communication with the plate opening 24 and hood opening 28. The cutout 46 is preferably sized to accommodate the refrigerant and control lines 14, 16. The rear paper sheet 44 may be connected to the frame members 36, 38 and/or the plate member 18 via mechanical fasteners, an adhesive, a bonding agent or other joining techniques known by those skilled in the art.

A front paper sheet 48 is positioned over the front surface 20 of the plate member 18 and includes a cutout 50 to fit around the hood member 26. The front paper sheet 48 may be formed from the same material as the rear paper sheet 44 and may be connected to the plate member 18 via mechanical fasteners, an adhesive, a bonding agent or other joining techniques known by those skilled in the art.

When installed, the flashing hood 10 provides a passageway through the outer wall 40 for passage of the refrigerant and control lines 14, 16. The internal sealing element 12 compresses around the outer surface of the lines 14, 16 to create a substantially weather-tight seal to weather-proof the passage (e.g., protect against water entry), and to mitigate entry of bugs, animals or debris through the passageway. In this regard, the sealing element 12 conforms to the size of the refrigerant and control lines 14, 16 to substantially close the opening around the lines 14, 16. Furthermore, insertion of the refrigerant and control lines 14, 16 is easy and does not require any additional caulking or assembly of the flashing hood 10 on the job site. In additional embodiments, a horizontal slit can be cut into the WRB and the upper edge of the hood can be slid beneath the WRB; inserted over the refrigerant lines and attached to the shear panel 37. Subsequently conventional flashing tape can be applied over the slit and around the hood to form a moisture barrier.

Although shown for use in relatively thick brick/stone façade walls, those skilled in the art will recognize the hood 10 can be utilized on thinner conventional stucco or wood siding clad walls with the length of the hood member 26 being formed or cut off in different lengths as desired.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combinations described herein. Thus, the scope of the claims is not to be limited by the illustrated embodiments.

What is claimed is:

1. A flashing hood configured for use with a utility line, the flashing hood comprising:
    a plate member having a first surface, an opposing second surface, and a plate opening extending between the first and second surfaces;
    a hood member of a quadrangular transverse cross section coupled to the plate member and extending from the first surface of the plate member and terminating at a distal end face defining a distal end plane orthogonal to the plate member, the hood member defining an internal hood opening in communication with the plate opening; and
    a sealing element coupled to the hood member and disposed within the hood opening and spaced apart from the distal end plane, the sealing element having a sealing element opening sized to receive and engage with the utility line for exerting a compressive force thereon, the sealing element being transitional relative to the hood member between a relaxed configuration and a compressive configuration in response to insertion of the utility line through the sealing element opening.

2. The flashing hood recited in claim 1, further comprising a sealing plate having a sealing plate opening extending therethrough, the sealing plate being coupled to the hood member and the sealing element, the sealing element opening being in communication with the sealing plate opening.

3. The flashing hood recited in claim 2, wherein the sealing plate opening is approximately 4 inches in diameter.

4. The flashing hood recited in claim 1, wherein the sealing element is formed from a polymer material.

5. The flashing hood recited in claim 1, wherein the sealing element is formed from an elastomeric material.

6. The flashing hood recited in claim 1, wherein the sealing plate is coupled to the plate member along a bottom edge of the plate opening.

7. The flashing hood recited in claim 1, wherein the plate opening defines a quadrangular configuration.

8. The flashing hood recited in claim 7, wherein the plate opening is approximately 5 inches×7 inches.

9. The flashing hood recited in claim 1, wherein the hood member and plate member form a unitary structure.

10. The flashing hood recited in claim 1, wherein the hood member extends from the plate member in a non-orthogonal orientation.

11. The flashing hood recited in claim 1, wherein the sealing element is biased toward the relaxed configuration.

12. The flashing hood recited in claim 1, the hood member having a proximal end coupled to the plate member, the sealing element being between the proximal end and distal end face.

13. The flashing hood recited in claim 12, wherein the sealing element is entirely within the hood opening and is disposed closer to the proximal end than the distal end face.

14. The flashing hood recited in claim 1, wherein the distal end face is spaced from the plate member.

15. The flashing hood recited in claim 1, wherein the distal end face circumnavigates the hood opening and is spaced from the plate member.

16. A flashing hood configured for use with a utility line, the flashing hood comprising:
   a plate member having a first surface, an opposing second surface, and a plate opening extending between the first and second surfaces;
   a hood member coupled to the plate member and extending from the first surface of the plate member and terminating at a distal end face orthogonal to the plate member and entirely spaced away from the plate member, the hood member defining an internal hood opening in communication with the plate opening; and
   a sealing element coupled to the hood member and disposed within the hood opening, the sealing element having a sealing element opening sized to receive and engage with the utility line for exerting a compressive force thereon, the sealing element
   being transitional relative to the hood member between a relaxed configuration and a compressive configuration in response to insertion of the utility line through the sealing element opening;
   wherein the sealing element is entirely within the hood opening and is spaced apart from the distal end face.

17. The flashing hood recited in claim 16, wherein the sealing element is entirely within the hood opening.

18. The flashing hood recited in claim 16, wherein the distal end face circumnavigates the hood opening.

19. The flashing hood recited in claim 16, wherein the sealing element is formed from a polymer material.

20. The flashing hood recited in claim 16, wherein the sealing element is formed from an elastomeric material.

\* \* \* \* \*